July 28, 1959  C. R. RUTZ ET AL  2,896,819
SINGLE DELIVERY WELDING ROD CONTAINER
Filed Dec. 11, 1956  3 Sheets-Sheet 1
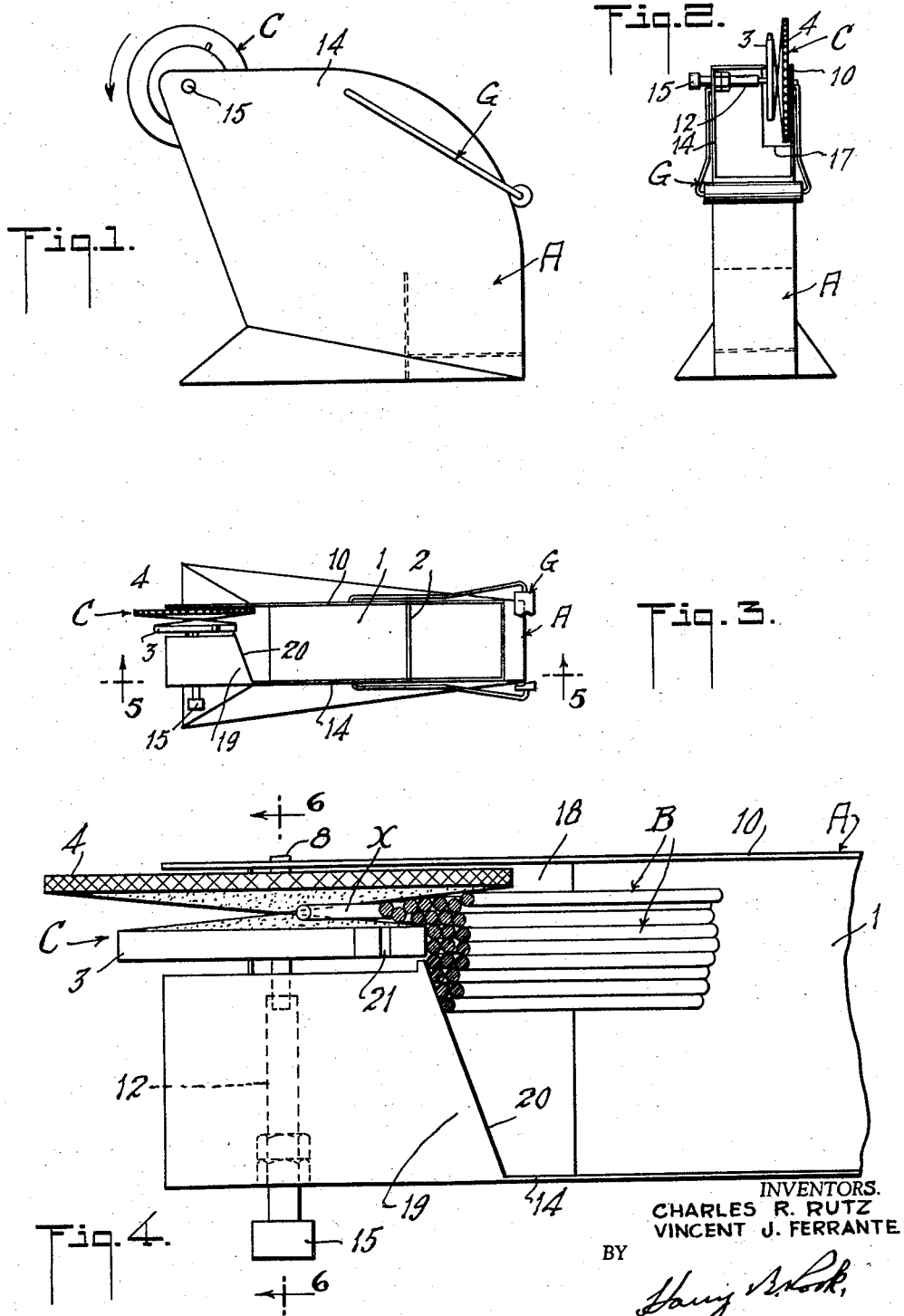
INVENTORS.
CHARLES R. RUTZ
VINCENT J. FERRANTE
BY
ATTORNEY

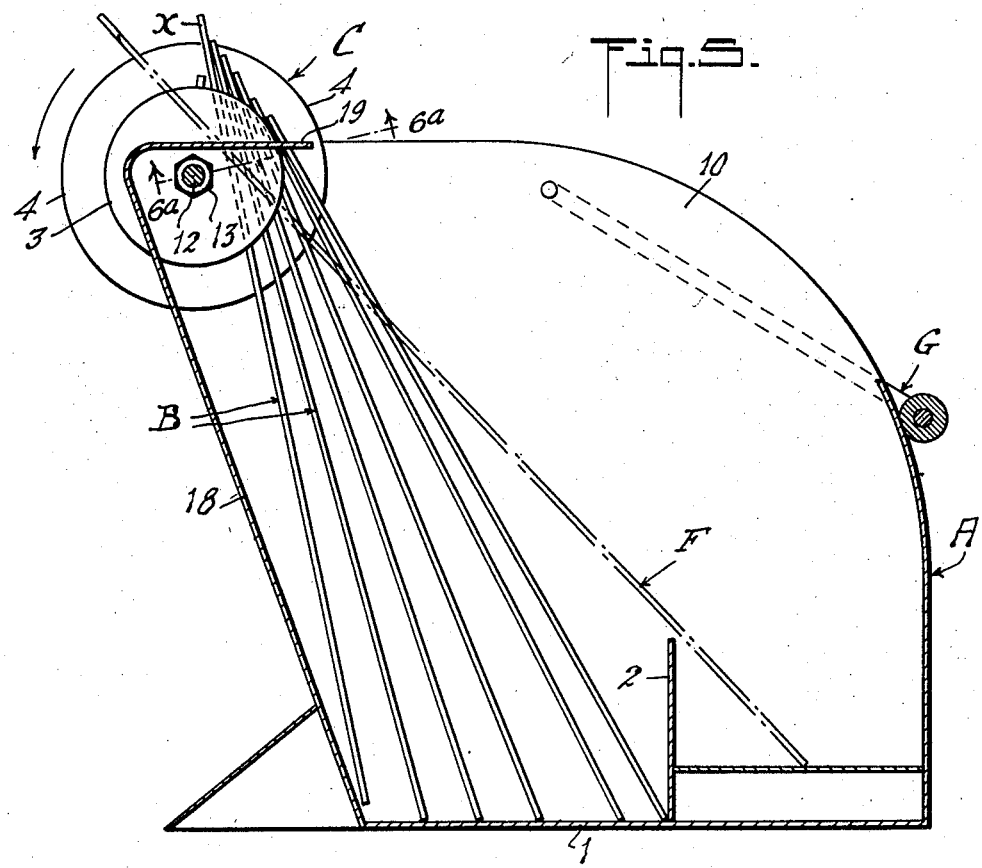
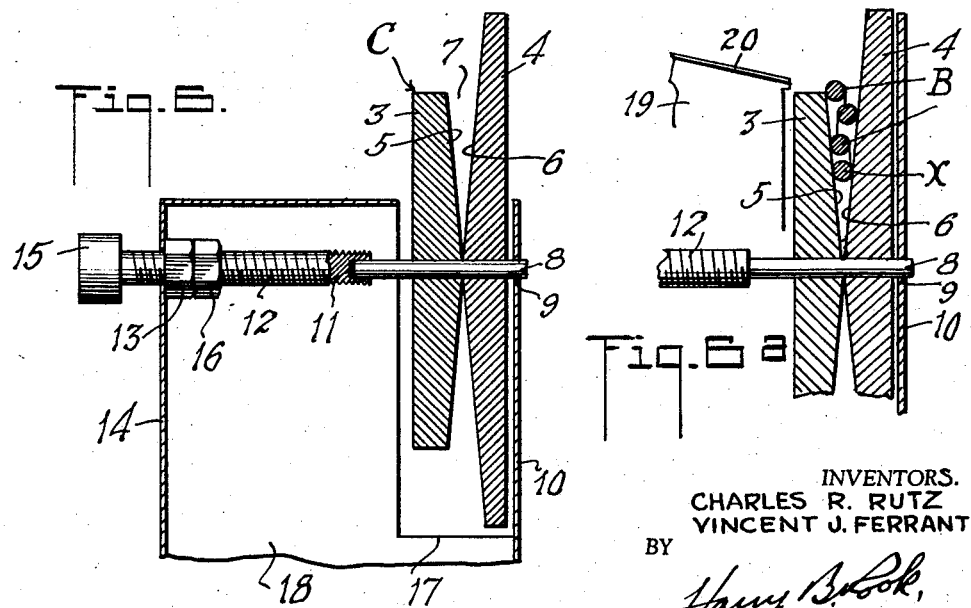

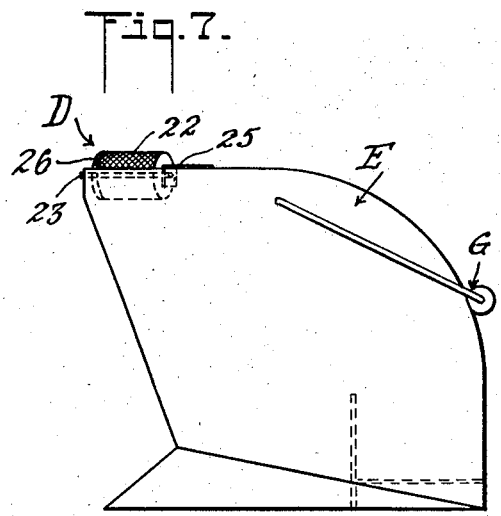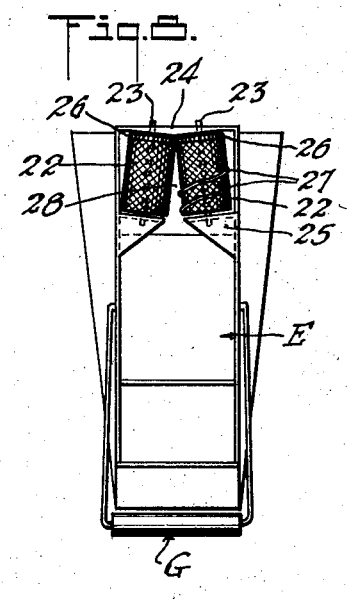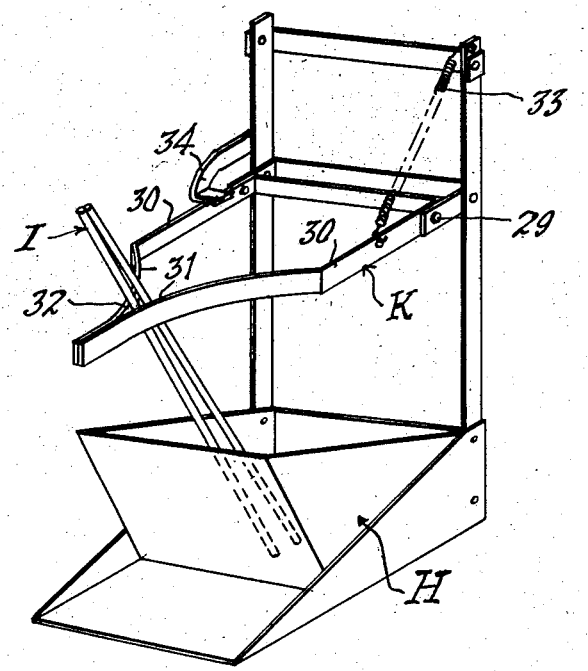

United States Patent Office 2,896,819
Patented July 28, 1959

2,896,819

SINGLE DELIVERY WELDING ROD CONTAINER

Charles R. Rutz, Newark, and Vincent J. Ferrante, Orange, N.J.

Application December 11, 1956, Serial No. 627,581

3 Claims. (Cl. 221—203)

This invention relates in general to a container for rods, particularly welding rods, to facilitate the carrying of a bundle or plurality of welding rods to the places where they are to be used and for singly delivering the rods to such a position in the container that one end of the rod is exposed and accessible for convenient grasping of the rod by the hand of the welder to thereby facilitate the removal of the rods from the container.

One object of the invention is to provide a single delivery rod container of this character which shall comprise a support having a bottom wall to hold a plurality of rods with one end loosely abutting said wall and with the rods leaning by gravity in one direction at an angle to a vertical plane, and a rod delivering mechanism mounted on said support and including two coaxial conical surface portions disposed in spaced opposed and converging relation to each other providing a V-shaped circumferential space or groove between them so that only one of the rods at a time can lean against said two surface portions at the same time with its upper end exposed thereabove.

Another object is to provide such a rod container wherein said mechanism is mounted on the support for movement of both of said surface portions simultaneously in one direction to frictionally lift a rod endwise upwardly and project the upper end of said rod above the corresponding ends of the other rods so that the upper end can be easily grasped by the hand of the operator and removed from the container.

Further objects are to provide in such a rod container, a rod delivery mechanism which shall comprise two circular sections each having a conical surface juxtaposed to the conical surface of the other and thereby forming a V-shaped groove between them to receive one and only one of the rods at a time between them and in frictional contact with both thereof, said sections being coaxially mounted on the support for simultaneous rotation in one direction so that upon such rotation, the frictional contact between the rod and said conical surfaces will cause the rod to be lifted endwise upwardly; and to make said sections of substantial and sufficient mass such that upon exertion of pressure by a rod against said conical surfaces as the rod is pulled by the operator from the container, the sections will be rotated and the momentum thereof will cause another rod to be lifted automatically into a position to be grasped by the operator.

Other objects are to provide in such a single delivery rod container, novel means for guiding the rods into the said V-shaped space between said conical surface portions; to provide means on said rod delivery mechanism to engage and agitate the rods to cause them to enter the space between said surface portions; and to obtain other advantages and results that will be brought out by the following description in conjunction with the accompanying drawings in which—

Figure 1 is a front elevational view of a single delivery welding rod container embodying the invention;

Figure 2 is an elevational view of one end thereof;

Figure 3 is a top plan view thereof with portions of the handle broken away;

Figure 4 is an enlarged fragmentary top plan view of the container with a plurality of rods therein, the upper end portions of all but one of which are broken away for clearness in illustration;

Figure 5 is an enlarged vertical longitudinal sectional view approximately on the plane of the line 5—5 of Figure 3 but showing a plurality of rods that are not illustrated in Figure 3;

Figure 6 is a transverse vertical sectional view approximately on the plane of the line 6—6 of Figure 4;

Figure 6a is an enlarged fragmentary sectional view approximately on the plane of the line 6a—6a of Figure 5;

Figure 7 is a view similar to Figure 1 showing a modification of the invention;

Figure 8 is a top plan view of the container shown in Figure 7, the figure being turned 90° on the sheet; and Figure 9 is a perspective view of another modification of the invention.

Specifically described the embodiment of the invention illustrated in Figures 1–6a inclusive, the reference character A designates a support or receptacle that has a bottom wall 1 and is open at its upper end so that a plurality of rods, such as welding rods B, may have their lower ends loosely set upon or abutting said bottom wall and the rods may lean in one direction at an angle to the vertical as shown in Figures 4 and 5 with their upper ends projecting beyond the receptacle or support. Preferably a vertical abutment partition 2 projects upwardly from said bottom wall to limit sliding of the lower ends of the rods along said bottom wall.

Mounted on the support or receptacle is a rod delivery mechanism generally designated C which is shown as comprising a device including two circular sections 3 and 4 which have the respective coaxial conical surfaces 5 and 6 juxtaposed to each other and providing a V-shaped space 7 between them so that only one of said rods at a time may enter between and simultaneously frictionally engage both of said surfaces as best shown in Figures 4, 5 and 6a. The two sections 3 and 4 are rigidly connected together, integrally, if desired, and are mounted on a shaft 8 which has one end journaled in a bearing opening 9 in one side vertical wall 10 of the support or receptacle and its other end journaled in a bearing socket 11 in a support bearing screw 12 which has a screw threaded connection with a nut 13 that is fixedly mounted on the opposite side wall 14 of the support or receptacle. This construction permits the mounting and removal of the shaft 8 from the support upon longitudinal movement of the screw 12 in the proper direction, a thumb piece 15 being provided to rotate the screw and a lock nut 16 being threaded on the screw 12 to lock the screw in its adjusted position. Obviously other means for mounting the sections 3 and 4 could be utilized.

Preferably one of the sections, in the present instance the section 4, is of greater diameter than the other section and the peripheral portion thereof projects through a notch 17 in one end wall 18 of the receptacle or support so that two sections can be rotated simultaneously by simply pressing a finger against the periphery of the section 4 and exerting a driving force in the direction indicated by the arrow in Figure 5.

At one side of the rod delivery mechanism C and adjacent the top of the support or receptacle is a guide member 19 having an edge portion 20 inclined from one side of the support or receptacle toward the space between the two sections 3 and 4 so that the rods will normally tend to slide along said edge 20 by action of gravity toward the space between the sections 3 and 4 as best shown in Figure 3. Preferably there is suitable means such as lug 21 on the section 3 of the delivery mechanism to engage and agitate the rods so as to cause them to enter the space between the sections 3 and 4 and to avoid such jamming of the rods as might prevent a rod from falling into contact simultaneously with both of the conical surfaces 5 and 6.

Obviously, the conical surfaces 5 and 6, preferably, will be roughened or serrated so as to effectually frictionally engage the rods.

In the operation of the single delivery container, the rods of a bundle of rods are loosely dropped endwise onto the bottom wall 1 and permitted to lean against the guide surface 20 and the larger conical surface 6 of the rod delivery mechanism C. One and only one of the rods designated $x$ will fall into the space between the conical surfaces 5 and 6 and touch both conical surfaces with a wedging action as shown in Figures 4, 5 and 6a with its upper end projecting above said surfaces of the rod delivery mechanism as shown in Figure 5. The operator may then press his hand with a brushing action against the periphery of the section 4 of the rod delivery device so as to spin the sections 3 and 4 in the direction indicated by the arrow in Figure 5, whereupon said rod will be frictionally lifted endwise and its upper end will be projected far above the ends of the other rods so that said projected end can be conveniently grasped by the hand of the operator for quick removal of the rod from the receptacle or support. When the operator removes the exposed rod and while so doing presses the rod against the conical surfaces 5 and 6, the rod delivery device turns and, due to its mass, continues to turn after removal of the rod and the lug 21 agitates the rods so as to cause another rod to fall into contact with both conical surfaces 5 and 6 and to be lifted into a position to be grasped by the operator. The removal of that rod with slight pressure thereof against the conical surfaces 5 and 6 will cause another rod to move into contact with both of said conical surfaces and to be elevated into position to be grasped by the operator and so on.

A modification of the invention is shown in Figures 7 and 8 which differs from the form shown in Figures 1–6 inclusive primarily in the construction of the rod delivery mechanism D which is shown as comprising two cylindrical rolls 22 that are rotatably mounted on the receptacle or support E with their axes converging so that only one rod may enter the V-shaped space 28 between said rolls and in contact simultaneously with the periphery of both thereof. As shown, each roll has a shaft or trunnions 23 journaled in one end wall 24 of the receptacle or support E and in bearing brackets 25 secured to the side walls of the receptacle or support as best shown in Figure 8. The rolls are constrained to rotate simultaneously at the same peripheral speed, and as shown, each roll has a gear 26 meshing with the gear of the other roll. Preferably the peripheries of the rolls are roughened or serrated, and when the rolls are simultaneously rotated, the rod that is in contact with both thereof will be frictionally lifted so as to project its upper end beyond the ends of the other rods. The periphery of one or both rolls may be formed with suitable means such as helical ribs 27 to agitate the rods to ensure the entry thereof one by one into contact with both of the rolls.

It may be desirable to handle rods of substantially different lengths and to ensure proper engagement with the rod delivery mechanism of rods substantially longer than the rods B. The partition 2 may be arranged in the receptacle so that the rods F (indicated by dot and dash lines in Figure 5) that are of greater length than the rods B may be arranged at one side of the partition 2 so that their lower ends will be more distantly spaced from the rod delivery mechanism C than are the ends of the shorter rods B. Of course, rods of only one length will be directed to the rod delivery mechanism at any one time.

Also, preferably the receptacle or support is provided with a handle or bail G for carrying the container and rods from place to place.

A further modification of the invention is shown in Figure 9 where the receptacle or support H has a bottom wall to be loosely buttingly engaged by the lower ends of the rods I with the rods leaning against a portion of the rod delivery mechanism K which comprises a lever pivotally mounted at one end on the support as indicated at 29 and having two spaced sections 30, portions 31 of which are disposed in converging relation to each other to provide a V-shaped space 32 between them so that only one rod at a time may enter between said portions and in frictional contact simultaneously with both thereof. The lever is normally yieldingly urged upwardly by a spring 33, upward movement into a normal position being limited as by a stop arm 34.

In operation of the container, the rods are placed with their lower ends against the bottom wall of the receptacle or support H so that the rods lean by gravity toward the V-shaped space 32, and one of the rods simultaneously frictionally engages both of the portions 31. To remove one of the rods the lever is manually pushed downwardly and then permitted to swing upwardly under the influence of the spring 33, although it could be manually swung upwardly, and during this action, the frictional engagement between the rod and the portions 31 of the lever cause said one rod to be frictionally lifted upwardly so as to project its upper end beyond the end of the other rods for convenience in removing said rod from the receptacle or support.

While we have shown several different forms of the invention, it should be understood that this is primarily for the purpose of illustrating the principles and that many modifications and changes can be made in the structural details within the spirit and scope of the invention.

What we claim is:

1. A single delivery apparatus for rods comprising a support having bottom and side elements to hold a plurality of rods with one end of each loosely abutting the bottom element of the support and with the rods leaning by gravity in one direction at an angle to the vertical, a rod delivery device having two coaxial conical surfaces providing a V-shaped circumferential groove between them of a size and shape to receive a plurality of rods between them with one and only one rod in frictional contact with both of said surfaces at the same time, means mounting said device on said support for rotation about a horizontal axis above said bottom element and coaxial with said conical surfaces providing for the leaning of the upper end portions of a plurality of rods against said device and each other with one of said rods in wedging frictional contact with both of said conical surfaces, and means on said support to guide a plurality of rods simultaneously into said circumferential groove so that said one rod will be gravitationally pressed by at least some of the other rods into said V-shaped groove, and said device upon rotation thereof in one direction will fractionally lift said one rod alone endwise upwardly and project the upper end of said rod above the corresponding ends of the other rods, said device having a weight or mass providing for continued rotation thereof under its own momentum after momentary application of driving force thereto and for the lifting longitudinally of any rod that is in frictional contact with both of said conical surfaces during such rotation of the device.

2. A single delivery apparatus for rods comprising a support having bottom and side elements to hold a plurality of rods with one end of each loosely abutting the bottom element of the support and with the rods leaning by gravity in one direction at an angle to the vertical, a rod delivery device having two coaxial conical surfaces providing a V-shaped circumferential groove between them of a size and shape to receive a plurality of rods between them with one and only one rod in frictional contact with both of said surfaces at the same time, means mounting said device on said support for rotation about a horizontal axis above said bottom element and coaxial with said conical surfaces providing for the leaning of the upper end portions of a plurality of rods against said device and each other with one of said rods in wedging frictional contact with both of said conical surfaces, and means on said support to guide a plurality of rods simultaneously into said circumferential groove so that said one rod will be gravitationally pressed by at least some of the other rods into said V-shaped groove, and said device upon rotation thereof in one direction will frictionally lift said one rod alone endwise upwardly and project the upper end of said rod above the corresponding ends of the other rods, one of said conical surfaces having a greater diameter at its larger end than the other conical surface, and the last-named means including a stationary guide adjacent and at the side of the larger end of the second-mentioned conical surface opposite the first-mentioned conical surface and coactive with the first-mentioned surface to guide the rods into said circumferential groove.

3. A single delivery apparatus for rods as defined in claim 2 with the addition of at least one projection on said device at the periphery of the larger end of the second-mentioned conical surface to engage and agitate the rods and cause them to enter said circumferential groove between said conical surfaces.

References Cited in the file of this patent

UNITED STATES PATENTS

| | | |
|---|---|---|
| 196,734 | Wright et al. | Oct. 30, 1877 |
| 687,731 | Cunningham | Dec. 3, 1901 |
| 1,043,169 | Tenow et al. | Nov. 5, 1912 |
| 1,102,377 | Wilton | July 7, 1914 |
| 1,705,241 | Domerude | Mar. 12, 1929 |
| 1,798,685 | Kurtenbach | Mar. 31, 1931 |
| 1,896,463 | Offerman | Feb. 7, 1933 |
| 2,380,450 | Klopfer | July 31, 1945 |
| 2,428,579 | Osborne | Oct. 7, 1947 |
| 2,608,037 | Lindhe | Aug. 26, 1952 |
| 2,805,569 | Billen et al. | Sept. 10, 1957 |

FOREIGN PATENTS

| | | |
|---|---|---|
| 718,599 | France | Jan. 26, 1932 |
| 886,224 | Germany | July 8, 1949 |